United States Patent
Wiegman et al.

(10) Patent No.: US 8,238,130 B2
(45) Date of Patent: Aug. 7, 2012

(54) LOW-MASS, BI-DIRECTIONAL DC-AC INTERFACE UNIT

(75) Inventors: Herman Lucas Norbert Wiegman, Niskayuna, NY (US); William Eugene Carlson, Liberty Township, OH (US); Paul Michael Perozek, Cincinnati, OH (US)

(73) Assignee: General Electric Company, Niskayuna, NY (US)

( * ) Notice: Subject to any disclaimer, the term of this patent is extended or adjusted under 35 U.S.C. 154(b) by 577 days.

(21) Appl. No.: 12/241,683

(22) Filed: Sep. 30, 2008

(65) Prior Publication Data

US 2010/0080030 A1    Apr. 1, 2010

(51) Int. Cl.
*H02M 7/537* (2006.01)
(52) U.S. Cl. .......................................... 363/131; 363/97
(58) Field of Classification Search ............... 363/34, 363/35, 37, 63, 65, 71, 97, 98, 123, 131, 363/132, 137
See application file for complete search history.

(56) References Cited

U.S. PATENT DOCUMENTS

| 4,161,771 | A  | * | 7/1979  | Bates ................................ 363/43 |
| 4,982,318 | A  | * | 1/1991  | Maeba et al. .................... 363/63 |
| 5,245,525 | A  | * | 9/1993  | Galloway et al. ............... 363/71 |
| 5,248,866 | A  | * | 9/1993  | Tanaka et al. ................... 219/624 |
| 5,361,196 | A  | * | 11/1994 | Tanamachi et al. ............ 363/41 |
| 6,693,805 | B1 | * | 2/2004  | Steigerwald et al. ........... 363/39 |
| 6,850,426 | B2 | * | 2/2005  | Kojori et al. .................... 363/123 |
| 2004/0037100 | A1 | * | 2/2004 | Orr et al. ......................... 363/131 |
| 2007/0047277 | A1 | * | 3/2007 | Konishi et al. .................. 363/131 |
| 2008/0062724 | A1 | * | 3/2008 | Feng et al. ....................... 363/17 |

* cited by examiner

*Primary Examiner* — Gary L Laxton
*Assistant Examiner* — Gustavo Rosario Benitez
(74) *Attorney, Agent, or Firm* — Scott J. Asmus

(57) ABSTRACT

A DC-AC converter includes a DC-DC converter providing bi-directional conversion between a first DC power signal and a second DC power signal, the first DC power signal being on a first DC bus and the second DC power signal being on a second DC bus. The DC-AC converter also includes an inverter providing bi-directional DC-AC conversion between a third DC power signal and a first AC power signals the third DC power signal being on the second DC bus and the first AC power signal being on a first AC bus.

17 Claims, 6 Drawing Sheets

Uni-Polar DC input, Biased AC Output

Integrated Power Conditioning Unit

LOW-MASS, BI-DIRECTIONAL DC-AC INTERFACE UNIT

BACKGROUND OF THE INVENTION

This invention relates to an electric power processing device, and more particularly, to a low-mass bi-directional DC-AC power converter. The low-mass, bidirectional DC-AC power converter can be incorporated into, for example, an aircraft power conditioning unit that interfaces generation equipment with various load equipment utilizing independent voltages levels and frequencies.

Many industries can benefit from lightweight power conditioning systems that are also flexible in providing a variety of voltages of different magnitudes and frequencies. One such industry is the aviation industry where advances in aircraft design (both manned and unmanned) are necessitating new electric power system architectures. For example, emerging aircraft have 270 VDC electrical power equipment while still maintaining legacy 115 VAC/400 Hz or variable frequency equipment. The 115 VAC is generated by a power converter that uses the 270 VDC as its input.

FIG. 1 illustrates a related art power conditioning system for an aircraft. The power conditioning system includes generator 10, Generator Control Unit (GCU) 15, External Power Connection (EPC) DC ground cart interface 40, high-voltage battery 20, low-voltage battery 30, DC-DC converter 50 and inverter/transformer unit 60. A typical aircraft may have two power conditioning systems similar to that illustrated in FIG. 1.

Generator 10 typically includes a wound field synchronous motor (WFSM) 12 that is configured to be used as a generator. The output of generator 10 forms high-voltage DC bus 25 by rectifying the output of WFSM 12 using rectifier 11. GCU 15 controls the excitation voltage of WFSM 12 to maintain a desired DC voltage at the output of generator 10. High-voltage DC bus 25 supplies most of the electrical power for the aircraft, and high-voltage DC bus 25 may, for example, have a magnitude of 270 VDC.

Connected to high-voltage DC bus 25 is on-board high-voltage battery 20. During normal operation, the charge on high-voltage battery 20 is maintained by generator 10 via the high-voltage DC bus. A battery charger and disconnect switches (both features not shown) may be connected between high-voltage DC bus 25 and high-voltage battery 20. When generator 10 is not available or if the power from generator 10 is insufficient, the system may be configured such that high-voltage battery 20 provides power to high-voltage DC bus 25 to operate the equipment. In some modern, more electric aircraft, the high-voltage battery is not connected to the bus, but is separated by a contactor, which is closed only when the main generator fails.

The input power to DC-DC converter 50 is provided by high-voltage DC bus 25, and the output of DC-DC converter 50 forms low-voltage DC bus 35 that supplies control power to the system avionics. During normal operation, the charge on low-voltage battery 30 is maintained by DC-DC converter 50 via low-voltage DC bus 35. A battery charger and disconnect switches (both features not shown) may be connected between low-voltage DC bus 35 and low-voltage battery 30. If DC-DC converter 50 is not operational or if the power from DC-DC converter 50 is insufficient, the system may be configured such that low-voltage battery 30 will provide power to low-voltage DC bus 35. The magnitude of low-voltage DC bus 35 may be, for example, 28 VDC.

Inverter/transformer unit 60 is a DC-AC converter that provides power to legacy equipment that run on AC power. Inverter/transformer unit 60 gets its supply from high-voltage DC bus 25 and converts it to AC power at, for example, 115 volts, 400 Hz.

EPC DC ground cart 41 can be connected to the aircraft's high-voltage DC bus 25 through DC ground interface 40 when the aircraft is on the ground. EPC DC ground cart 41 powers the high-voltage DC equipment and also provides power to the 115 volt, 400 Hz equipment via inverter/transformer unit 60. Other systems may have an EPC AC ground card interface that connects directly to the legacy AC bus.

Inverter/transformer unit 60 represents a related art solution employing a DC bus inverter with an output isolation transformer. Inverter/transformer unit 60 may also be configured as a DC-DC converter with an isolation transformer or a DC-DC converter with bi-polar voltage and a direct DC-AC stage.

FIG. 2 illustrates an exemplary topology for inverter/transformer unit 60 shown in FIG. 1. The supply power from high-voltage DC bus 25 is fed to DC filter 61, which filters out any noise on the high-voltage DC supply power. In this example, the input DC supply is uni-polar, i.e., one leg of the DC supply is grounded to the chassis. Multi-phase inverter 62 receives the filtered DC voltage and produces a biased, poly-phase AC output that is sent to transformer 63. Transformer 63 provides isolation and converts the AC signal from multi-phase inverter 62 to a desired AC voltage. AC filter 64 receives the AC signal from transformer 63 and provides a filtered AC output. An AC signal at the output of transformer 63 may be sent to controller 65 as a feedback signal to adjust multi-phase inverter 62 if the output voltage from transformer 63 deviates from a desired voltage.

In the related art topology of FIG. 2, the output of AC filter 64 is a non-biased, isolated AC voltage supply. In addition, the topology is such that the power can flow in either direction (bi-directional). However, use of transformer 63 in an aircraft is not desirable because the transformer is heavy and awkward (approximately 70 lbs for a 6-10 kVA unit operating at 400 Hz).

FIG. 3A depicts a transformer-less topology, inverter 70, that can be substituted for the inverter/transformer unit 60 of FIG. 1. The negative DC rail of the DC voltage supply is grounded, i.e., at chassis potential. Therefore, although inverter 70 does not have a transformer, it produces an AC signal that is biased. That is, the output AC signal from AC filter 71 will not be centered at zero volts (see FIG. 3B). Multi-phase inverter 72 can be configured such that the "average" value of the output sine waves and the peak-to-peak values of the output sine waves can vary as shown by the solid curve and the dotted-line curve in FIG. 3B. However, because the DC bus negative is grounded, inverter 70 will produce output sine waves whose values are always positive.

An output sine wave that is always positive is a problem if the AC system is "expecting" a neutral referenced AC sine wave, i.e. a sine wave whose values are positive and negative (for example, the legacy AC system is typically 115 VAC/400 Hz). Therefore, in order to use the topology of FIG. 3A to provide a neutral referenced AC source, an isolation stage will be required between the uni-polar DC bus and the input side of inverter 70. This will increase the complexity, cost and weight of the system.

FIG. 4 depicts another related art topology, inverter 80, that can produce a non-biased, isolated AC output. In this topology, an isolated converter, DC-DC converter 86, is located between DC filter 81 and multi-phase inverter 82. DC-DC converter 86 has a high frequency transformer that provides the isolation for the system. The high frequency transformer is lower in weight (less than 10 lbs) than the transformer in FIG. 2. However, this topology also has drawbacks.

For example, DC-DC converter 86 must process the total power and derive a "new" isolated DC voltage that can be center tapped grounded to the chassis. In addition, DC-DC converter 86 does not provide bidirectional power flow. Therefore, an AC source, such as an EPC AC ground cart, cannot be used to generate the DC bus when the aircraft is grounded. To add bi-directional capability to the topology shown in FIG. 4, additional components and controls must be added to both sides of DC-DC converter 86, which increases cost, complexity and weight.

Accordingly, the related art power conditioning units are awkward and heavy (transformers), do not easily provide bi-directional power flow capability (i.e., without requiring additional components), and/or produce an output voltage supply that is not optimal for an aircraft. Therefore, it is desirable to have a transformer-less power conversion unit that produces a non-biased, balanced isolated AC voltage supply. Preferably, the power conversion unit can also produce positively biased AC outputs, negatively biased AC outputs and non-biased AC outputs.

Main engine start has traditionally been done using an air-turbine starter (ATS). The ATS uses compressed air generated from a compressor powered by the on-board auxiliary power unit (APU) (e.g., a small or dedicated device used to compress air such as an electric generator), an external ground cart or the aircraft's other engine (if there is more than one). In order to be more autonomous, however, the aviation industry is requiring that emerging aircraft start their main engines with less ground support. Accordingly, aircraft are being designed to start their engines electrically (i.e., without an ATS), which requires a strong DC source.

One option for providing the electrical start is to provide a ground cart that not only powers DC equipment as described earlier but is also sized to perform a main engine start by providing sufficient power to inverter 120 to run the WFSM 12 in engine-start mode or to assist the on-board battery in performing the main engine start. Another option is to use an EPC AC ground cart (not shown in FIG. 1) to provide supplemental power via an AC to DC inverter to help the on-board battery in performing the main engine start. A third option is to size the on-board battery to perform the main engine start without requiring supplemental power from an external ground cart. The third option allows the aircraft to be more autonomous than either of the other two options.

Unfortunately, all these options have their drawbacks. DC ground carts typically have a power limit of approximately 90 kVA or less, based on historical equipment and EPC connectors used on aircraft. High-power ground carts that are rated to perform main engine starts are not very common and are typically only found in the largest airports or military bases. Future aircraft will have to be flexible and have the ability to start their engines anywhere in the world. For the AC ground cart option, the additional circuitry needed to allow the EPC AC ground cart to assist in the main engine start will add additional weight and complexity to the related art power conditioning units. Although the third option of providing an engine start capable on-board battery will provide this flexibility, the weight and cost of the battery makes this option prohibitive.

In addition, related art power conditioning units are not designed to regulate the power going to the legacy AC bus during main engine start. Without regulation, main engine starts may create power fluctuations that cause power blackouts in the legacy AC system, which would necessitate longer aircraft commissioning times.

Therefore, along with having a transformer-less power conditioning unit that produces a non-biased, isolated AC voltage supply from the high-voltage DC bus, it is also desirable to have a power conditioning unit that will help enable electric main engine start by using commonly available EPC AC ground carts and low-power EPC DC ground carts to supplement the power from the on-board battery. Preferably, power to the legacy AC bus is regulated to minimize blackouts during main engine starts.

SUMMARY OF THE INVENTION

In an embodiment of the invention, a DC-AC converter includes a DC-DC converter providing bi-directional conversion between a first DC power signal and a second DC power signal, the first DC power signal being on a first DC bus and the second DC power signal being on a second DC bus. The DC-AC converter also includes an inverter providing bi-directional DC-AC conversion between a third DC power signal and a first AC power signal, the third DC power signal being on the second DC bus and the first AC power signal being on a first AC bus.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 5:
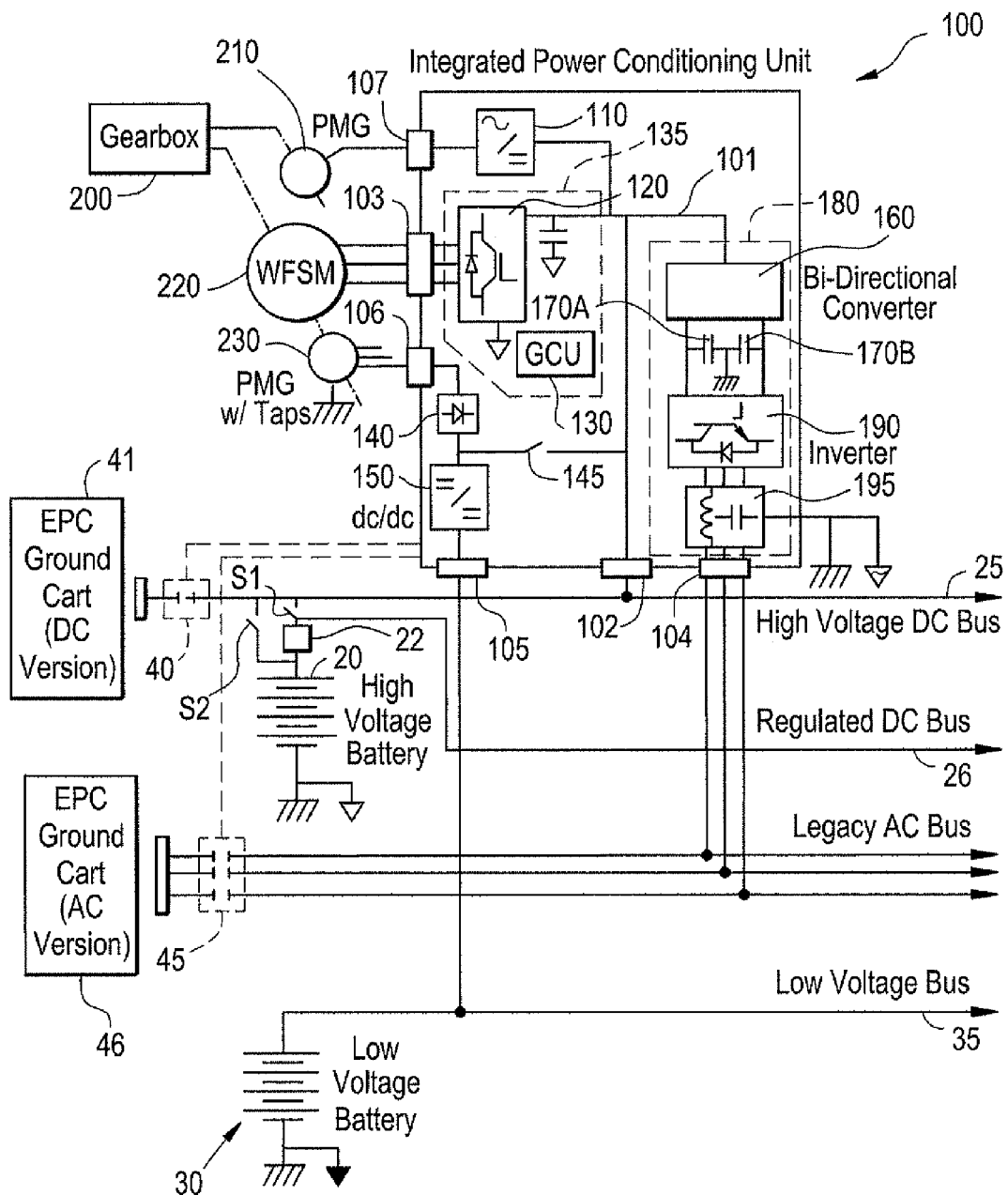
FIG. 5 is a block diagram of a power conditioning unit with a bi-directional DC-AC converter that is consistent with the present invention.

FIG. 5 illustrates a block diagram of a power conditioning unit comprising a low-mass, bi-directional DC-AC converter that is consistent with the present invention. Specifically, power conditioning unit 100 comprises DC bus 101, DC-DC converter 110, inverter circuit 135, rectifier 140, switch 145, DC-DC converter 150 and low-mass, bi-directional DC-AC converter 180. DC bus 101 is connected to high voltage DC bus 25 by terminal 102.

Inverter circuit 135 is a bi-directional AC-DC converter that converts the power flowing between WFSM 220 and DC bus 101 into the appropriate voltage form (i.e., AC and DC). Inverter circuit 135 is connected to WFSM 220 at terminal 103 and comprises inverter 120 and GCU 130. GCU 130 regulates the output voltage of inverter circuit 135.

Engine gear box 200 has a shaft for accepting WFSM 220. The shaft is engaged to engine gear box 200 during main engine startup and normal flight operation. During normal flight operation, WFSM 220 is a generator that supplies inverter circuit 135 with AC power. Inverter 120 of inverter circuit 135 converts the AC power from WFSM 220 to DC power. The DC power is then supplied to DC bus 101, which is connected to the high voltage bus 25 at terminal 102.

PMG 230, which is mounted on the same shaft as WESM 220, supplies power to rectifier 140, which then feeds DC-DC converter 150. DC-DC converter 150 feeds low voltage DC bus 35, which supplies control power to the system avionics. Although PMG 230 and DC-DC converter 150 are shown directly supplying low voltage DC bus 35 in FIG. 5, other configurations may be employed to interface PMG 230 to a DC bus (low or high) during normal or emergency conditions. For example, switch 145 enables PMG 230 to supply high voltage DC bus 25, if needed.

Along with feeding high-voltage DC bus 25 via DC Bus 101 during normal flight operation, inverter circuit 135 also feeds bi-directional DC-AC converter 180. Bi-directional DC-AC converter 180 converts the power flowing between the legacy AC bus and DC bus 101 into the appropriate voltage form (i.e., AC and DC). Bi-directional DC-AC converter 180 is connected to the legacy AC bus at terminal 104 and comprises bi-directional DC-DC converter 160, smoothing capacitors 170A and 170B, multi-phase inverter 190 and filter 195.

Figure 1:
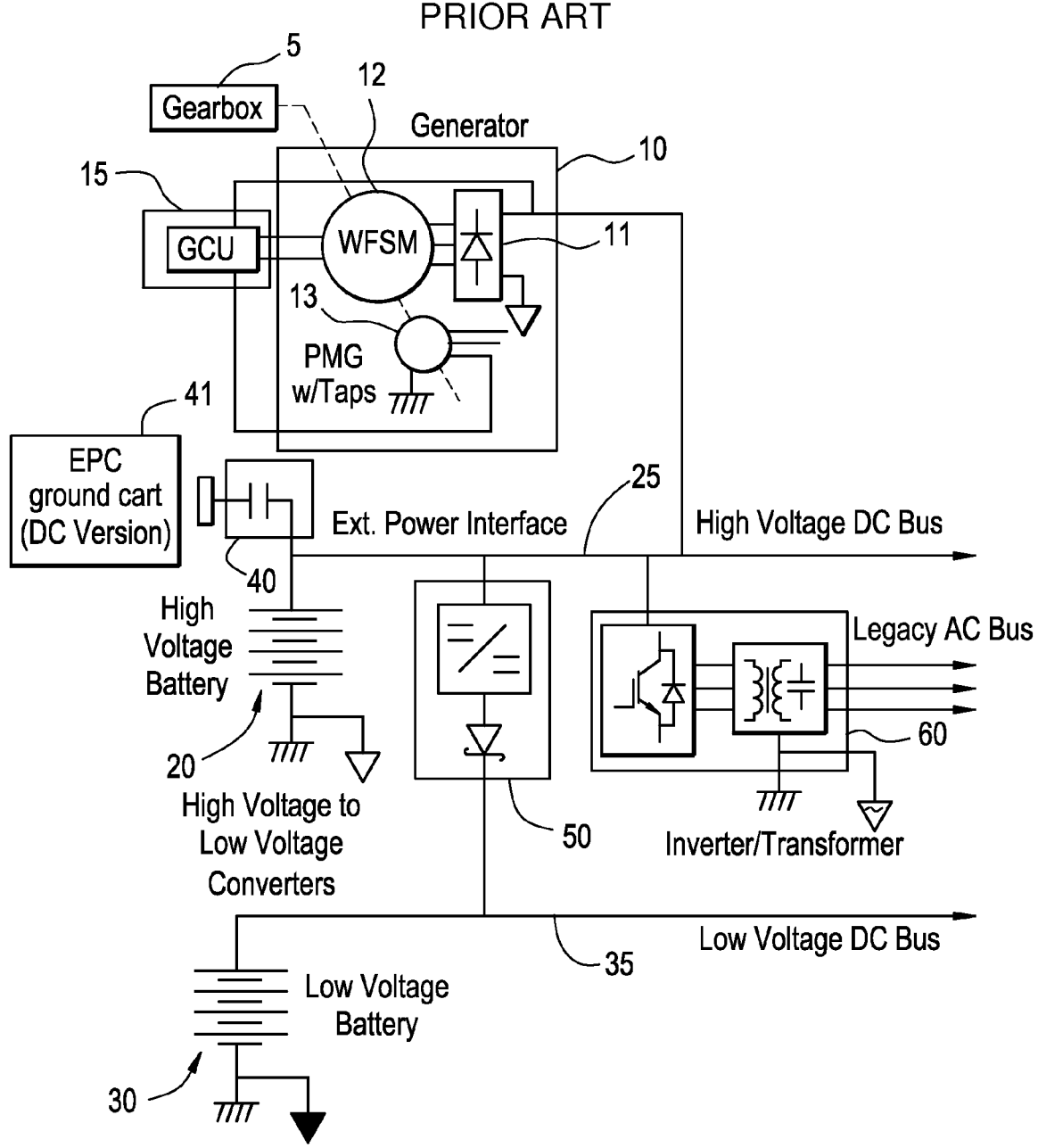
FIG. 1 is a block diagram of a related art power conditioning system in an aircraft.
Figure 2:
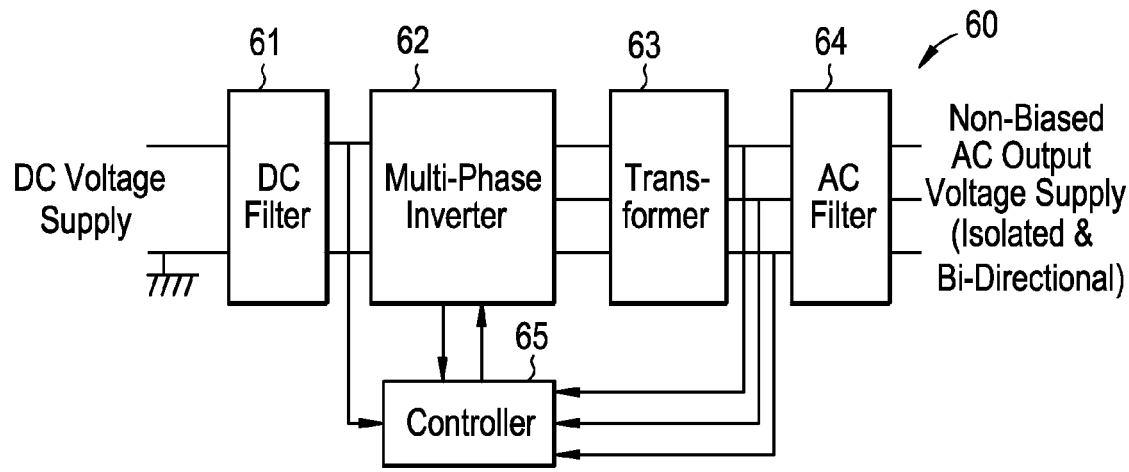
FIG. 2 is an example of a related art topology for the inverter/transformer of FIG. 1.
Figure 3A:
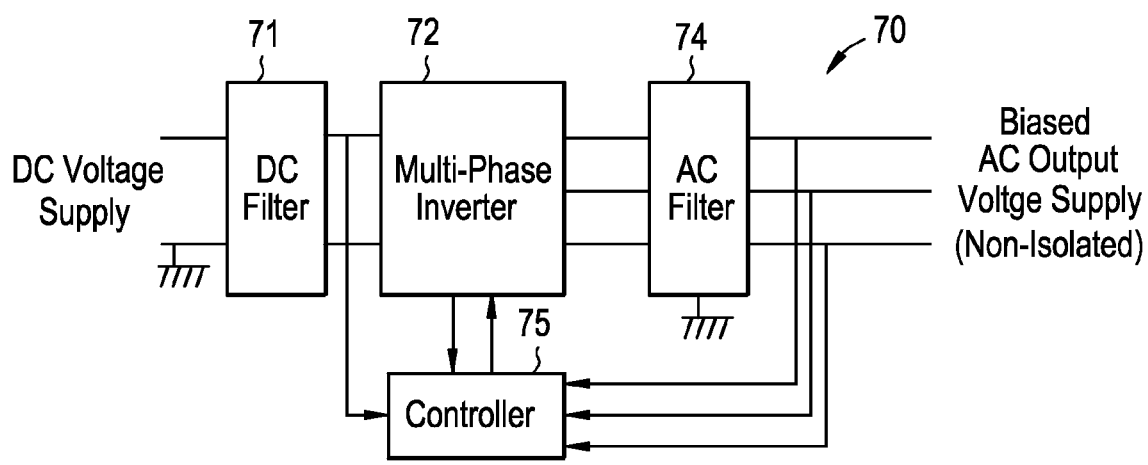
FIG. 3A is an example of a related art topology for a power converter that can be used in the system of FIG. 1.
Figure 3B:
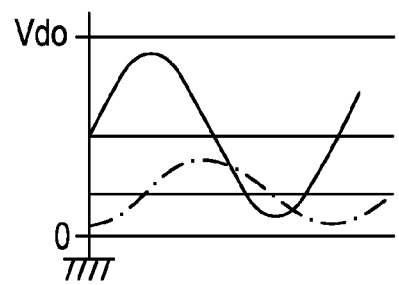
FIG. 3B illustrates examples of the output AC waveforms from the related art power converter of FIG. 3A.
Figure 4:
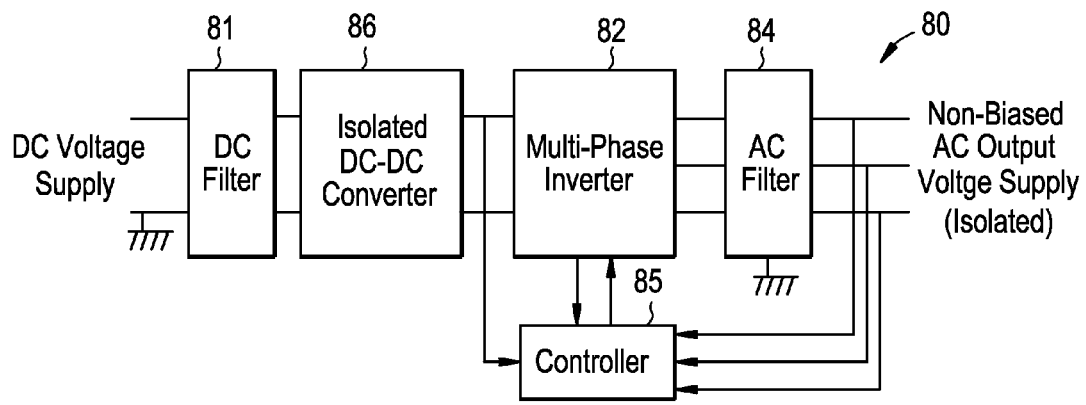
FIG. 4 is an example of a related art topology for a power converter that can be used in the system of FIG. 1.
Figure 6A:
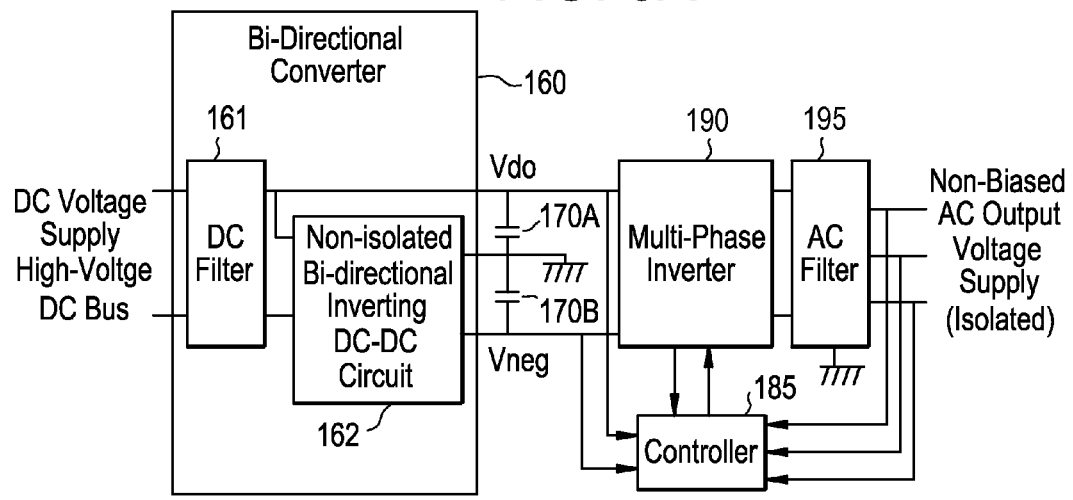
FIG. 6A illustrates a more detailed block diagram of the bi-directional DC-AC converter shown in FIG. 5.

Multi-phase inverter 190 provides bi-directional AC-DC conversion between the legacy AC bus and the connection to bi-directional DC-DC converter 160. Bi-directional DC-DC converter 160, as the name implies, provides bi-directional DC-DC conversion between DC bus 101 and the connection to multi-phase inverter 190. Bi-directional DC-DC converter 160 may be configured as shown in FIG. 6A. In FIG. 6A, bi-directional DC-DC converter 160 comprises DC filter 161, which is optional, and non-isolated, bidirectional DC-DC circuit 162.

Consistent with the present invention, bi-directional DC-DC circuit 162 may incorporate an inverting DC-DC topology. For example, bi-directional DC-DC circuit 162 may include a bi-directional Ćuk converter (FIG. 7A) or a bi-directional buck-boost converter (FIG. 7B). These converters invert the incoming voltage, i.e., they accept a voltage $V_{dc}$ and output, for example, a voltage $-V_{dc}$.

Figure 7A:
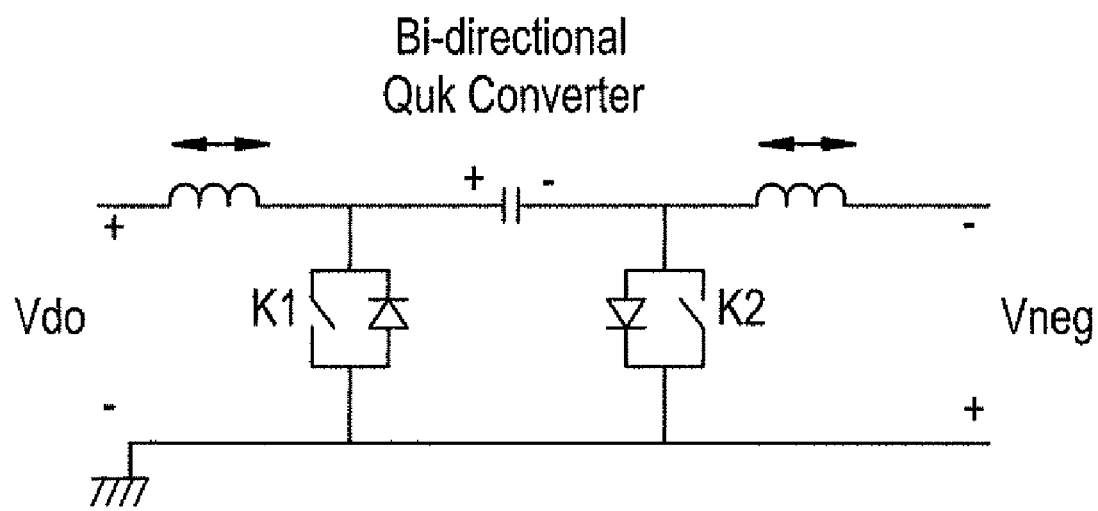
FIG. 7A is a circuit diagram of a bi-directional Auk converter that can be used in the bi-directional DC-DC circuit of FIG. 6A.
Figure 7B:
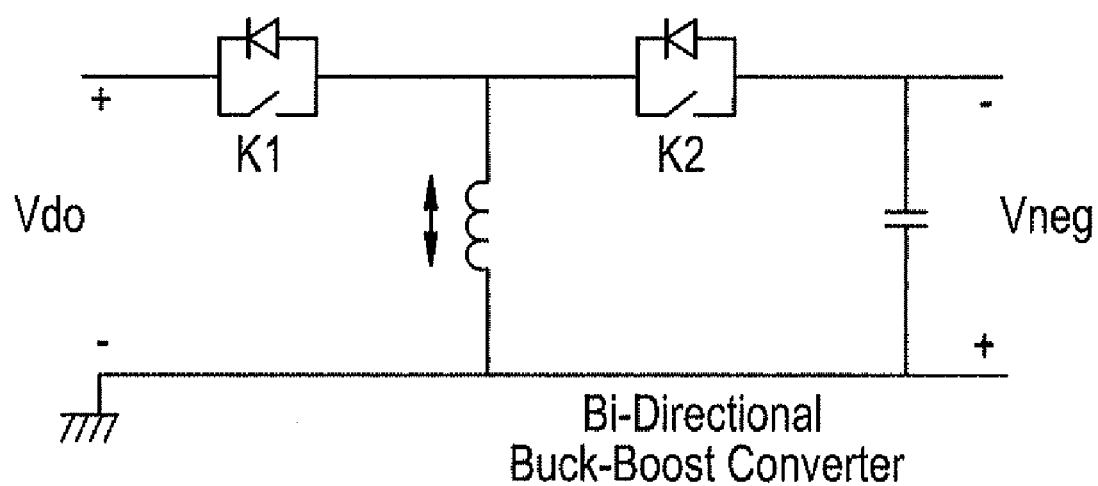
FIG. 7B is a circuit diagram of a bi-directional Buck-Boost converter that can be used in the bi-directional DC-DC circuit of FIG. 6A.

The switches K1 and K2 in FIG. 7A for the Ćuk converter and switches K1 and K2 in FIG. 7B for the buck-boost converter can be any type of switching device that blocks forward voltage and has controlled on-off gating such as, for example, transistors, MOSFETS, IGBTs, etc. One skilled in the art is familiar with the operation of a Ćuk converter and a buck-boost converter. Therefore, the operation of these converters will not be further described here.

An inverting DC-DC topology, such as that provided by the Ćuk converter and the buck-boost converter, is desirable because the bi-directional DC-DC converter 160 can then be configured to provide a bi-polar DC voltage to multi-phase inverter 190.

As shown in FIG. 6A, bi-directional DC-DC converter 160 receives uni-polar DC voltage from DC bus 101. An optional DC filter 161 may be included in bi-directional DC-DC converter 160 (or externally) to filter the DC bus signal. Bi-directional DC-DC converter 160 then outputs a bi-polar DC voltage to multi-phase inverter 190. Multi-phase inverter 190 can then develop balanced neutral AC waveforms that are bi-polar in nature, if needed. One skilled in the art is familiar with the operation of multi-phase inverter 190 and it will not be further described here.

The uni-polar to bi-polar conversion by bi-directional DC-DC converter 160 is accomplished by connecting one input terminal of bi-directional DC-DC circuit 162 to the positive output, Vdc, of DC filter 161, and the other input terminal to chassis ground via DC filter 161. Therefore, bidirectional DC-DC circuit 162 will have an inverted output, with one rail grounded to the chassis and the other rail forming the −Vneg bus. Although the output is inverted, the magnitude of Vneg does not necessarily have to equal the magnitude of Vdc. Any asymmetry can be accounted for by appropriately controlling the modulation of the multi-phase inverter 190.

Typically, the voltage Vdc is 270 VDC and, in related art systems, this value is just adequate for multi-phase inverter 190 to generate 115 VAC. However, with the embodiment shown in FIG. 6A, the voltage across multi-phase inverter 190 can be greater than 270 VDC, which ensures adequate voltage supply to produce a 115 VAC output. That is, when the power flows from the high-voltage DC bus to multi-phase inverter 190, bi-directional DC-DC converter 160 can adjust the output voltage from 0 to −270 VDC. This will produce a differential of 270 VDC to 540 VDC across multi-phase inverter 190.

In addition, by using the topology of FIG. 6A, bi-directional DC-DC converter 160 only processes ½ the total power used by the load connected to multi-phase inverter 190. This is because the positive bus of the DC bus, e.g. the 270 VDC bus, is sent directly to multi-phase inverter 190 and only the power in the negative bus is processed by bidirectional DC-DC circuit 162.

Figure 6B:
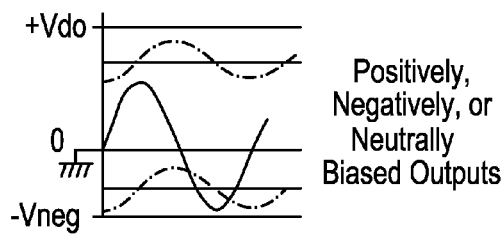
FIG. 6B illustrates examples of the output AC waveforms form the bi-directional DC-AC converter of FIG. 6A.

FIG. 6B illustrates examples of AC output waveforms that can be produced using the embodiment shown in FIG. 6A. As seen in FIG. 6B, in a bi-directional DC-AC converter consistent with the present invention, the AC output waveforms can be positively biased, negatively biased or non-biased (neutral).

When not in flight, an aircraft using a power conversion unit consistent with the present invention can receive electrical power from AC or DC ground carts. For example, when power is received from EPC AC ground cart 46 (FIG. 5) through AC ground interface 45, the AC power supplied by EPC AC ground cart 46 is converted to DC by bi-directional DC-AC converter 180. Specifically, multi-phase inverter 190 receives the AC power signal and feeds a DC power signal to bi-directional DC-DC converter 160, which supplies high-voltage bus 25 via DC bus 101. This configuration can be used to charge the high-voltage battery 20 via battery charger 32 and provide power to any DC equipment that is operating. Battery charger 22 will be described in more detail below.

If EPC AC ground cart 46 is used to assist in main engine start, power from bi-directional DC-AC converter 180 is used to supplement the power from on-board high-voltage battery 20 feeding inverter circuit 135. Inverter circuit 135 then converts the combined DC power to AC to start WFSM 220.

When power is received from DC ground cart 41 through DC ground interface 40, the DC power is fed directly to high-voltage DC bus 25. DC ground cart 41 can then be used to charge high-voltage battery 20 and provide power to any DC equipment that is operating.

If EPC DC ground cart 41 is used to assist in main engine start, the DC power supplied by DC ground cart 41 supplements the power from on-board high-voltage battery 20 feeding inverter circuit 135. As before, inverter circuit 135 converts the combined DC ower to AC to start WFSM 220. If the rating of DC ground cart 41 is high enough, DC ground cart 41 can provide sufficient power to perform the main engine start without any need for supplemental power from on-board high-voltage battery 20.

Conversely, if on-board high-voltage battery 20 is big enough, then on-board high-voltage battery 20 may be used to perform the main engine start without the use of any ground carts. Although this configuration would allow the aircraft to be most autonomous, such a big on-board battery is typically not practical.

In the embodiment shown above, DC bus 101 is uni-polar and inverter circuit 135 and bi-directional DC-AC converter 180 are configured to accept a uni-polar bus. However, power conditioning units with other topologies are also within the scope of the present invention. Another exemplary embodiment is shown in FIG. 8.

Figure 8:
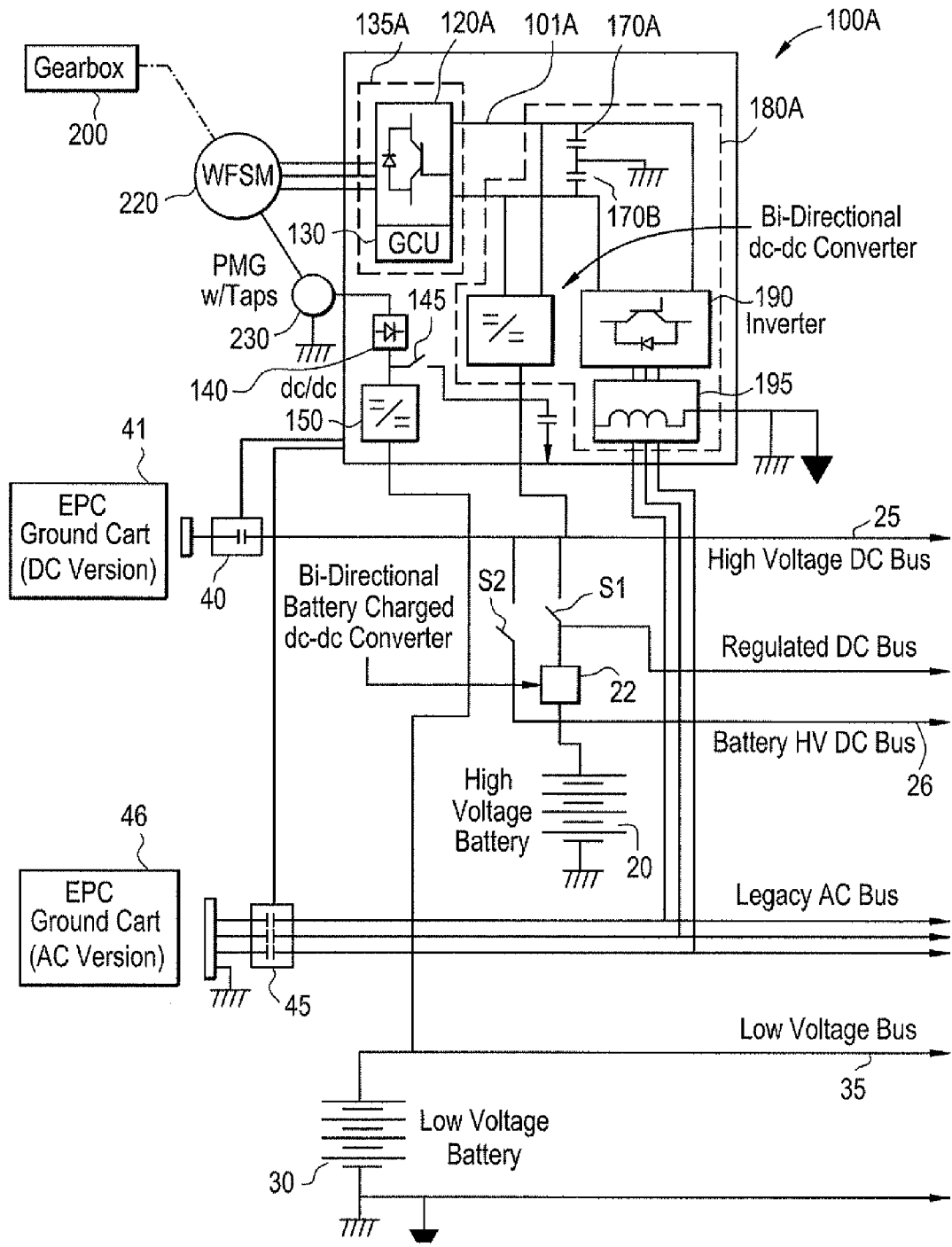
FIG. 8 is a block diagram of another power conditioning unit with another bi-directional DC-AC converter that is consistent with the present invention.

In FIG. 8, bi-polar DC bus 101A connects inverter 120A of inverter circuit 135A to multi-phase inverter 190 of bi-directional DC-AC converter 180A. In this topology, bidirectional DC-AC converter 180A is configured such that when connected to inverter circuit 135, bi-directional DC-DC converter 160, multi-phase inverter 190 and inverter circuit 135 are connected in "parallel." Bi-directional DC converter 160 is connected to high-voltage DC bus 25 via uni-polar DC bus 101B.

In this embodiment, because inverter circuit 135A provides a bi-polar DC bus, bi-directional DC-DC converter 160 is not needed to convert a uni-polar bus to a bi-polar DC bus for multi-phase inverter 190. However, bi-directional DC-DC converter 160 is configured to perform DC-DC conversion between uni-polar high-voltage DC bus 25 and bi-polar DC bus 101A. Bi-directional DC-DC converter 160 in this embodiment may also be configured as shown in FIG. 6A.

As described above, power conditioning units having topologies that incorporate bi-directional DC-AC converters consistent with the present invention can produce a non-biased, isolated AC voltage supply to the legacy equipment. Because these bi-directional DC-AC converters are transformer-less, the size and weight of the power conditioning unit will be optimal for an aircraft.

In addition, because these bi-directional DC-AC converters include a bi-directional DC-DC converter that supplies regulated power to the multi-phase inverter feeding the legacy AC system, the power blackouts on the legacy loads are minimized during main engine starts.

However, some DC equipment on the high-voltage DC bus 25 that require reboot sequences if power is interrupted can still be adversely affected during main engine start (avionics are typically on the low-voltage, e.g. 28 volt, bus and, thus, generally not affected by voltage fluctuations on the high-voltage bus). The problems associated with the DC equipment requiring reboot sequences will only increase as more equipment is transferred from the legacy AC bus to the high-voltage DC bus.

Accordingly, an embodiment of the present invention includes a high-voltage battery charger that comprises a bi-directional DC-DC converter. As shown in FIGS. 5 and 8, bi-directional DC-DC battery charger 22 can be placed between high-voltage battery 20 and high-voltage battery bus 25. Disconnect switches S1 and S2 allow for various modes of operation described in more detail below.

Typically, an unregulated battery system can vary from −40% to +15% of the rated DC bus voltage due to processes ranging from heavy load engine start to "charging" the battery. This variation in voltage may create problems with DC equipment, on high-voltage bus 25, that require reboot sequences if power is interrupted. By placing bi-directional DC-DC battery charger 22 between high-voltage DC bus 25 and high-voltage battery 20, regulated DC bus 26 can be created. The DC equipment requiring reboot sequences can then be reconfigured to receive power from regulated DC bus 26. Using this arrangement, regulated DC bus 26 will have approximately a +/−5% window of regulation, which will ensure that the DC equipment remain on-line. If the voltage on high-voltage battery 25 varies due to the main engine being started up via WFSM 220, bi-directional DC-DC battery charger 22 will regulate the DC voltage going to regulated DC bus 26 at a desired voltage level (e.g., 270 volts).

When the main engine is being started by WFSM 220 using EPC DC ground cart 40 and/or high-voltage battery 20, switch S1 is open and switch S2 is closed. With S1 open, the DC equipment requiring reboot sequences will be isolated from high-voltage DC bus 25 during engine start. With S2 closed, power from high-voltage DC battery 20 can supplement power from EPC DC ground cart 40 to start WFSM 220 via power conditioning unit 100 or 100A. Power also flows to bi-directional DC-DC battery charger 22 to supply regulated DC bus 26. During main engine start-up, the voltage at the output of high-voltage DC battery 20 and, hence, high-voltage bus 25 may vary significantly. However, high-voltage battery charger 22 will ensure that the voltage on regulated DC bus 26 remains relatively constant. Similarly, bi-directional DC-AC converters 185 and 185A of power conditioning units 100 and 100A, respectively, ensure that the AC voltage on the legacy AC system remains at a desired level, e.g., 115 volts.

If EPC AC ground cart 46 is used to provide supplemental power to help on-board high-voltage battery 20 in starting the main engine, then, along with powering legacy AC equipment, the power from EPC AC ground cart 46 will flow to WFSM 220 via power conditioning unit 100 or 100A. Similar to the scenario given above, the voltage on high-voltage DC bus 25 and, hence, high-voltage battery 20 could vary. As before, bi-directional DC-DC battery charger 22 will ensure that the voltage on regulated DC bus 26 remains relatively constant.

When the main generator, WFSM 220, is on-line, switch SI may be closed to provide regulated DC voltage to high-voltage bus 26 from the output of power conditioning unit 100 or 100A. If WFSM 220 is on-line and switch S1 is closed, high-voltage battery 20 may be recharged and can be put on "float charge" by bi-directional DC-DC battery charger 22. "Float charge" is the condition where the high-voltage battery 20 is maintained in the fully charged state during normal operation. During normal operation, high-voltage battery 20 will remain on "float charge" with switch S1 closed and switch S2 open.

If both switches S1 and S2 are closed, high-voltage battery 20 will recharge at its maximum rate. In this mode, bi-directional DC-DC battery charger 22 is inactive.

By using switches S1 and S2, high-voltage battery 20 can be maintained in-flight, including specially recharging high-voltage battery 20 if required due to battery chemistry. Traditionally, to "equalize charge" the battery, it was necessary to either remove the battery from the aircraft or provide special ground cart equipment to service the battery. "Equalize charge" is the condition where maintenance is performed on a battery by applying a voltage that is higher (e.g., by 15%) than the normal rated voltage.

However, with the embodiments shown in FIGS. 5 and 8, the high-voltage battery 22 can be put on "equalize charge" whenever WFSM 220 on-line (in-flight or on the ground) by closing switch S1, opening switch S2 and increasing the output voltage setting of bi-directional DC-DC battery charger 22.

When the aircraft is not in flight and the main generator is off-line, EPC ground cart power (AC or DC) can be connected to the respective ground interfaces 40 and 45 to provide external power to the aircraft. If switch S1 is closed and switch S2 is open, the external power can charge (float or equalize) high-voltage batter 20.

Additionally, if the aircraft is on the ground and WFSM 220 is on-line, then aircraft power may be used to supply power externally. If switch S1 is open and switch S2 is closed, power from WFSM 220 can be sent externally via EPC terminals 40 or 45 while still maintaining voltage on regulated DC bus 26 using bi-directional DC-DC battery charger 22.

In the above embodiments, power conditioning units 100 and 100A are uni-polar bus units that generally use the aircraft metal chassis as a conductor path similar to a 12 Volt negative ground system on an automobile. However, the present invention can also be applied to a bi-polar bus arrangement.

Although the present invention has been taught with 270 VDC and 115 VAC systems, the present invention is also applicable to emerging "double voltage" 540 VDC and 230 VAC systems.

While the invention has been described in terms of various specific embodiments, those skilled in the art will recognize that the invention can be practiced with modification within the spirit and scope of the claims.

What is claimed is:

1. A bidirectional DC-AC converter, comprising:
   a DC-DC converter providing bi-directional conversion between a first DC power signal and a second DC power signal, the first DC power signal being on a first DC bus and the second DC power signal being on a second DC bus; and
   an inverter providing bi-directional DC-AC conversion between a third DC power signal and a first AC power signal, the third DC power signal being on a third DC bus and the first AC power signal being on a first AC bus,
   wherein the third DC power signal comprises the first DC power signal biased by the second DC power signal; and
   wherein a voltage magnitude of the second DC power signal is inverted with respect to a voltage magnitude of the first DC power signal.

2. The DC-AC converter of claim 1, further comprising:
   an AC filter connected to the first AC bus to filter the first AC power signal.

3. The DC-AC converter of claim 1, wherein the bi-directional DC-DC circuit comprises a Ćuk converter.

4. The DC-AC converter of claim 1, wherein the bi-directional DC-DC circuit comprises a buck-boost converter.

5. The DC-AC converter of claim 1, wherein a rail of the first DC bus is connected to a first rail of the third DC bus and a rail of the second DC bus is connected to a second rail of the third DC bus.

6. The DC-AC converter of claim 5, wherein a voltage across the third DC bus is between 270 to 540 VDC.

7. The DC-AC converter of claim 1, further comprising:
   a DC filter connected to the first DC bus to obtain the first DC power signal.

8. The DC-AC converter of claim 5, wherein the first DC power signal is a uni-polar DC signal and the second DC power signal is a bi-polar DC signal.

9. A power conditioning unit for an aircraft, comprising:
   a DC-DC converter providing bi-directional conversion between a first DC power signal and a second DC power signal, the first DC power signal being on a first DC bus and the second DC power signal being on a second DC bus;
   an inverter providing bi-directional DC-AC conversion between a third DC power signal and a first AC power signal, the third DC power signal being on a third DC bus and the first AC power signal being on a first AC bus; and
   a second inverter providing bi-directional AC-DC conversion between a second AC bus and the first DC power signal, the second AC power signal being on a second AC bus;
   wherein the third DC power signal comprises the first DC power signal biased by the second DC power signal; and
   wherein a voltage magnitude of the second DC power signal is inverted with respect to a voltage magnitude of the first DC power signal.

10. The power conditioning unit for an aircraft of claim 9, wherein the first DC bus is uni-polar.

11. The power conditioning unit for an aircraft of claim 9, wherein the second DC bus is bi-polar.

12. The power conditioning unit for an aircraft of claim 9, wherein the bi-directional DC-DC circuit is a Ćuk converter.

13. The power conditioning unit for an aircraft of claim 9, wherein the bi-directional DC-DC circuit is a buck-boost converter.

14. The power conditioning unit for an aircraft of claim 9, wherein a rail of the first DC bus is connected to a first rail of the third DC bus and a rail of the second DC bus is connected to a second rail of the third DC bus.

15. The power conditioning unit for an aircraft of claim 14, wherein a voltage across the third DC bus is between 270 to 540 VDC.

16. The power conditioning unit for an aircraft of claim 9, wherein the first DC power signal is a uni-polar DC signal and the second DC power signal is a bi-polar DC signal.

17. The DC-AC converter of claim 1, wherein the first DC power signal is biased positively, negatively, or neutrally.

* * * * *